(12) United States Patent
Wall

(10) Patent No.: US 7,207,587 B1
(45) Date of Patent: Apr. 24, 2007

(54) REMOTE CONTROLLED HYDRAULIC GOOSENECK FOR TRACTOR TRAILERS

(75) Inventor: George W. Wall, Oelwein, IA (US)

(73) Assignee: X-L Specialized Trailers Inc., Manchester, IA (US)

( * ) Notice: Subject to any disclaimer, the term of this patent is extended or adjusted under 35 U.S.C. 154(b) by 213 days.

(21) Appl. No.: 10/906,980

(22) Filed: Mar. 15, 2005

(51) Int. Cl.
B62D 53/06 (2006.01)

(52) U.S. Cl. .............................. 280/425.2; 280/417.1; 280/441.2

(58) Field of Classification Search .............. 280/417.1, 280/423.1, 425.1, 425.2, 441.1, 441.2
See application file for complete search history.

(56) References Cited

U.S. PATENT DOCUMENTS

| | | | |
|---|---|---|---|
| 3,756,443 A * | 9/1973 | Verschage et al. | 414/481 |
| 4,390,192 A | 6/1983 | Wagner | |
| 4,423,885 A | 1/1984 | Camey et al. | |
| 4,472,100 A * | 9/1984 | Wagner | 414/481 |
| 5,415,425 A * | 5/1995 | Zerbe et al. | 280/441.2 |
| 5,435,586 A * | 7/1995 | Smith | 280/425.2 |
| 6,378,887 B2 * | 4/2002 | Landoll et al. | 280/425.2 |
| 6,874,803 B2 * | 4/2005 | McDougall et al. | 280/441.2 |
| 6,932,372 B2 * | 8/2005 | French et al. | 280/417.1 |

* cited by examiner

Primary Examiner—Lesley D. Morris
Assistant Examiner—L. Lum
(74) Attorney, Agent, or Firm—James C. Nemmers (57) ABSTRACT

A gooseneck for connecting a tractor to a trailer. The gooseneck has a remotely controlled unit for operating the hydraulic and pneumatic systems that provide for moving a slidable king pin plate to different loading positions so as to balance the load for over-the-road transport. The gooseneck also has a pivotal rear end to assist in connection of the gooseneck to the trailer. A pivotal gooseneck stinger arm maintains the gooseneck in position for accurate placement during connection and disconnection of the gooseneck and trailer. All of the necessary movements for connecting and disconnecting the tractor and trailer can be accomplished remotely with a minimum of effort by the tractor trailer operator.

6 Claims, 7 Drawing Sheets

REMOTE CONTROLLED HYDRAULIC GOOSENECK FOR TRACTOR TRAILERS

The invention relates to a truck-trailer gooseneck for interconnecting a low-boy trailer to a truck tractor.

In the commercial trucking industry, semi-trailer systems are used in which a tractor is coupled to a load carrying trailer for transportation of loads over the road. Typically, the low-boy trailer is used for transporting construction equipment as well as miscellaneous other loads. The flatbed of the low-boy trailer is supported at the trailing end by one or more sets of wheels with the bed extending forwardly where it is connected to a gooseneck that supports the free end of the bed for over-the-road movement. The gooseneck then in turn is connected to the fifth wheel of the tractor. The gooseneck typically has a vertical section that is connected to the forward end of the trailer and a horizontal section, the forward end of which is releasably connected to the fifth wheel of the tractor. Thus, the gooseneck can be connected to different tractors and also to different trailers depending on the load being carried. The tractor trailer operator must of course make the various connections which are generally done by hydraulic or pneumatic systems that require the operator to dismount from the tractor to make the various coupling and uncoupling operations. With prior art systems, this may require the operator to go back and forth from the tractor to the trailer to properly connect and position the components of the system for coupling and decoupling. Moreover, because of the over-the-road axle weight limitations, it is desirable that the weight of the load be optimally distributed between the tractor and trailer axles. There is therefore a need for a system to provide better versatility in loading and unloading the loads on the trailer in a quick and efficient manner that minimizing the time and effort of the tractor trailer operator. There is also a need for an improved system for distributing the weight of the load and balancing it for over-the-road travel.

SUMMARY OF THE INVENTION

The invention is for a gooseneck for tractor trailers that a moveable king pin plate and locking pins that lock the plate it in a selected position for different loading positions so as to balance the trailer load for over-the-road transport. A pivotal gooseneck stinger arm maintains the gooseneck in position for accurate placement during connection of the trailer. Oversized stirrups and tapered lock pins on the trailer allow easy attachment of the gooseneck to the trailer even on terrain that is not level while an air operated safety lock pin locks the trailer to the gooseneck. All of the necessary movements can be accomplished remotely with a minimum of effort by the tractor trailer operator.

DESCRIPTION OF THE PREFERRED EMBODIMENT OF THE INVENTION

Figure 1:
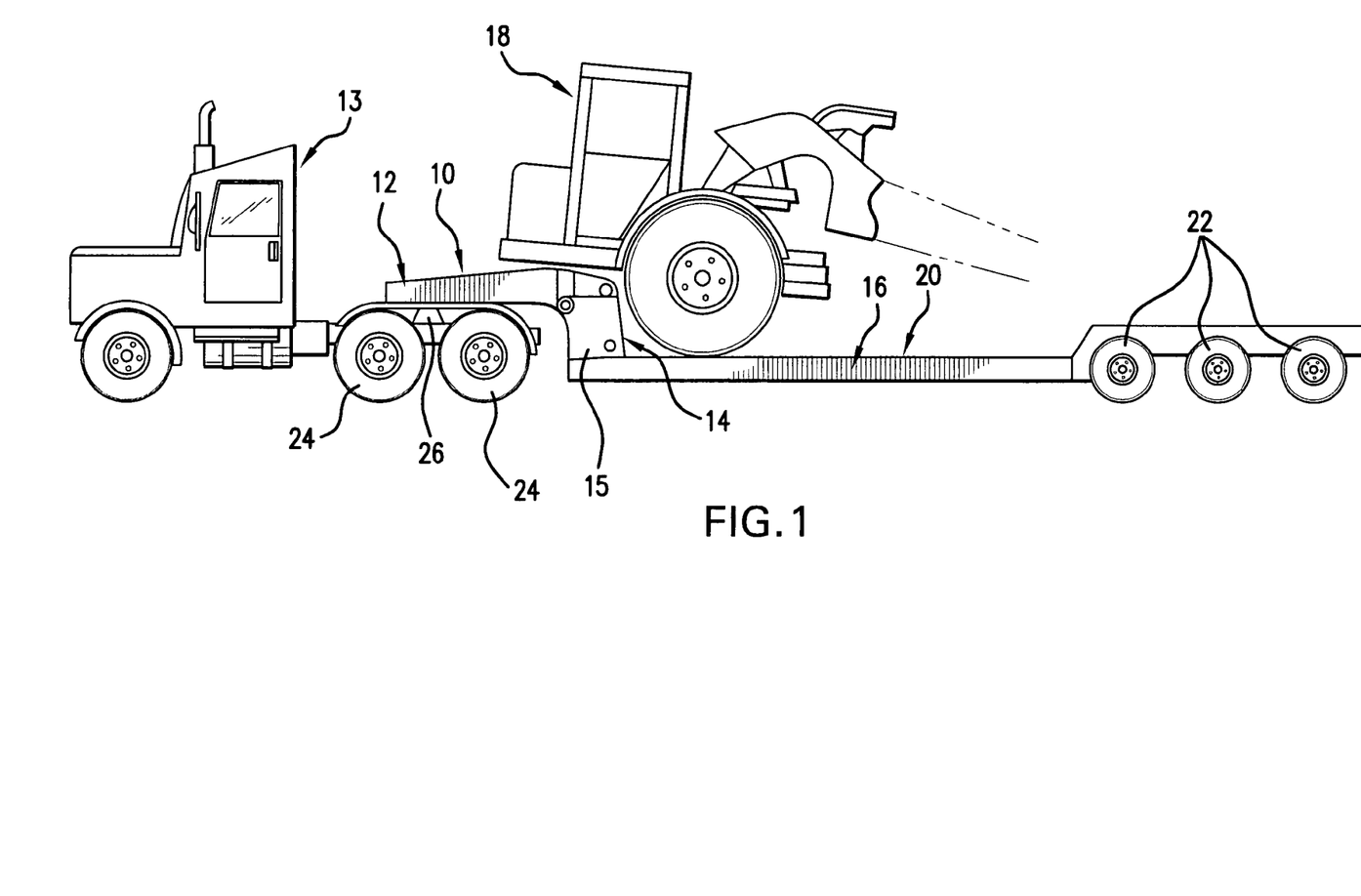
FIG. 1 is a side elevational view of a tractor-trailer combination of the type to which the invention relates.
Figure 2:
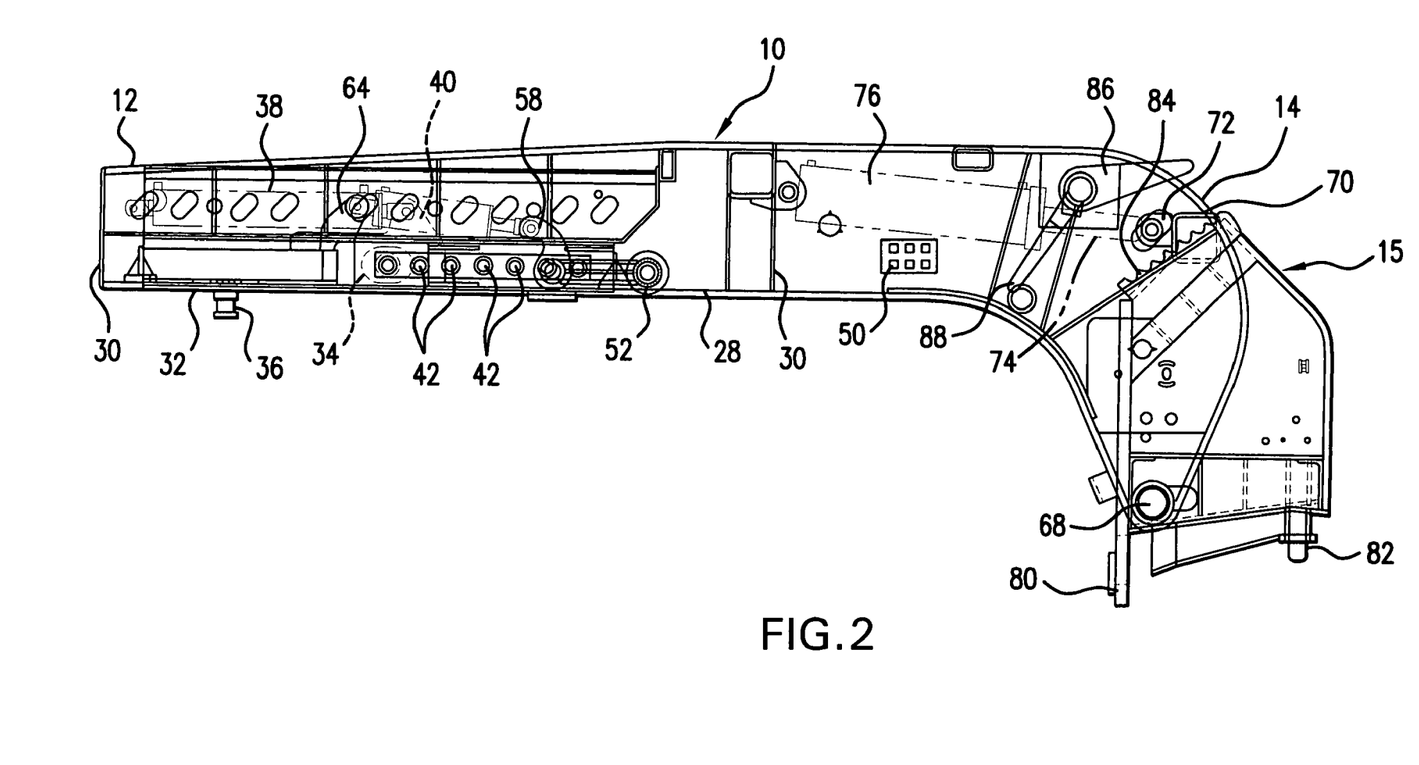
FIG. 2 is a side elevational view of the gooseneck and base unit of the invention.
Figure 3:
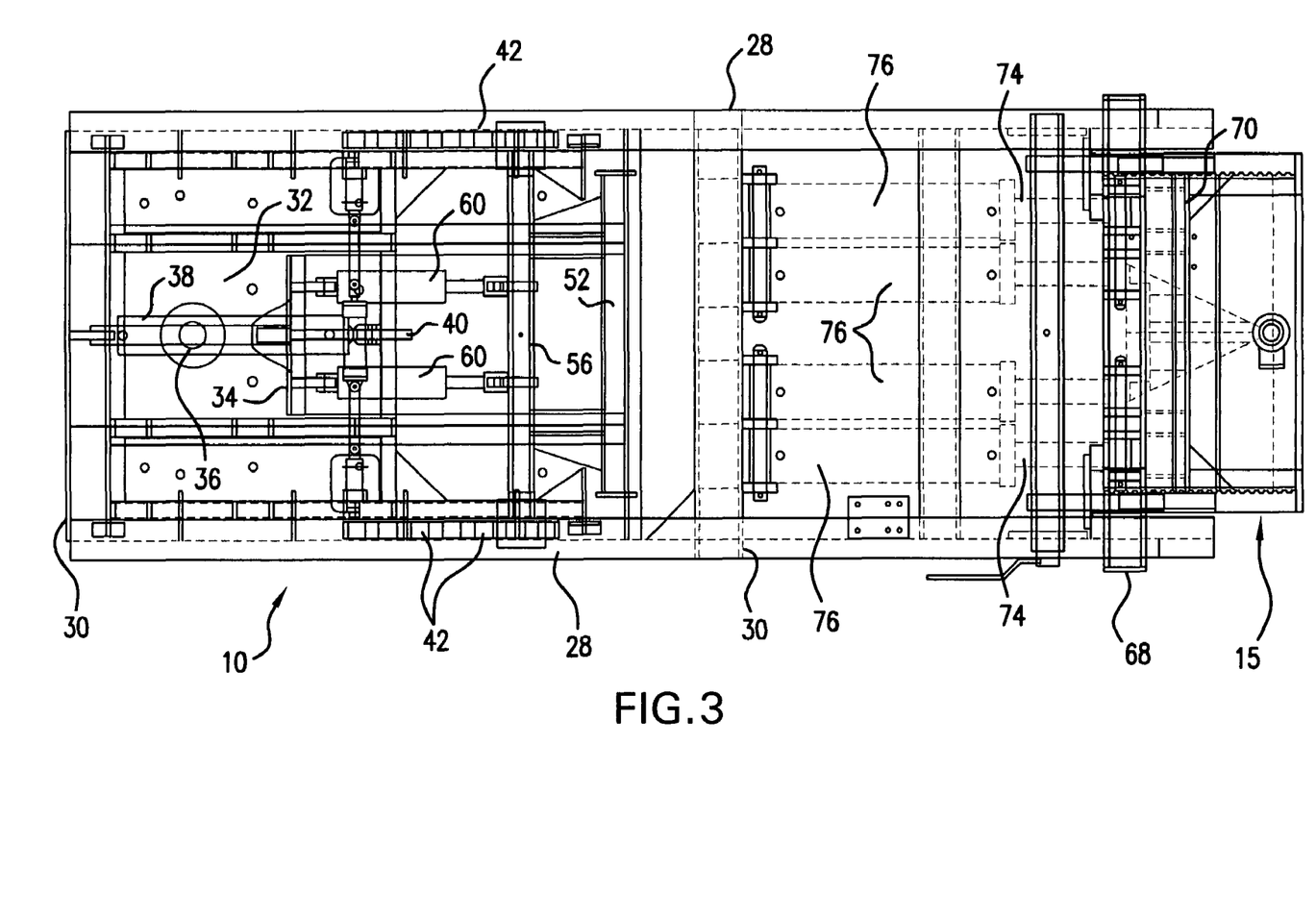
FIG. 3; is a top or plan view of the gooseneck.
Figure 4:
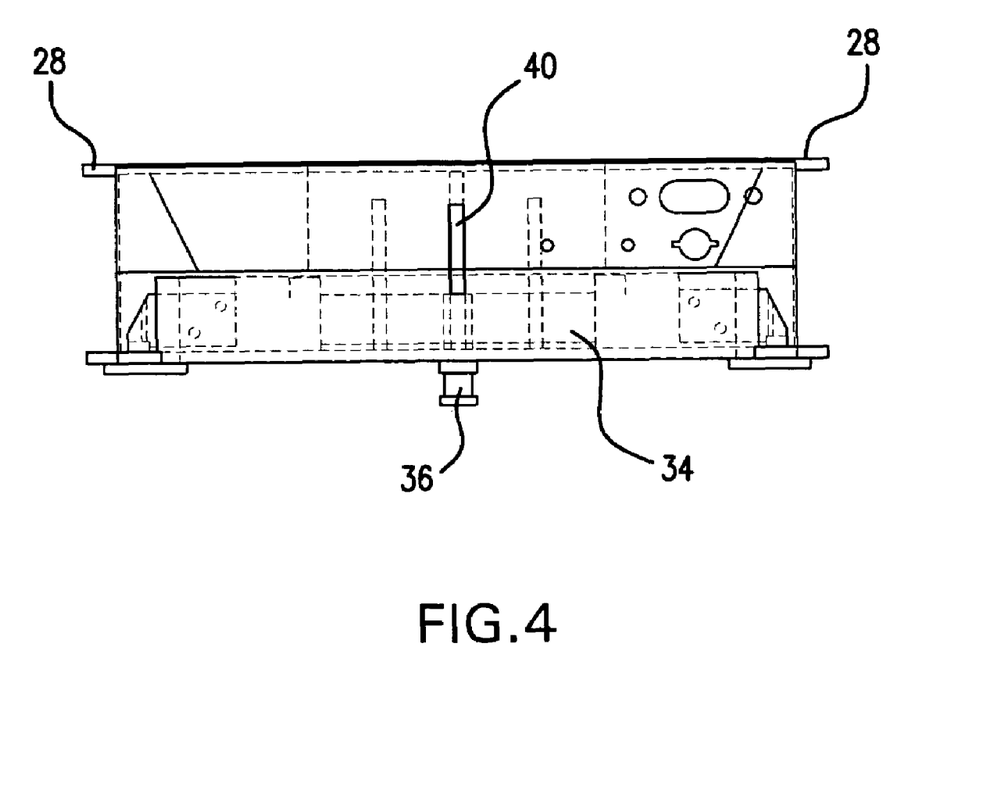
FIG. 4 is a front end elevational view of the gooseneck.
Figure 5:
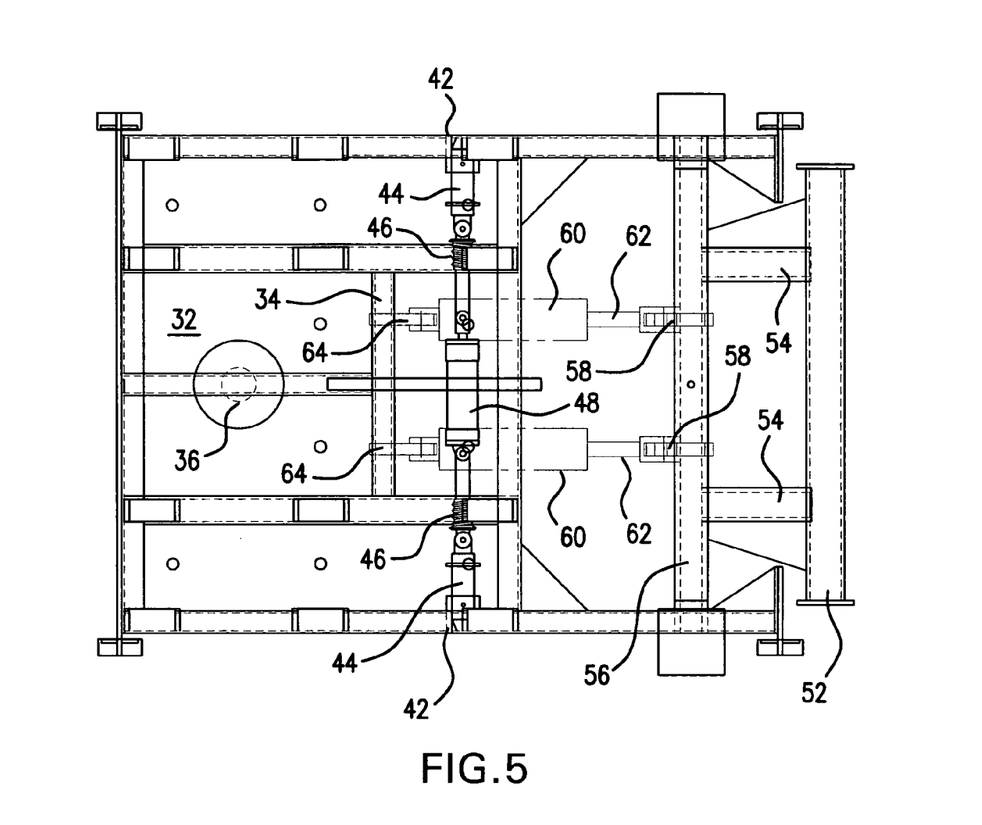
FIG. 5 is a top or plan view of a portion of the gooseneck with parts removed to better illustrate the king pin plate and stinger arm.

Referring first to FIGS. 1, 2 and 3, there is illustrated a gooseneck 10 constructed in accordance with the teachings of the present invention. As is well known to those skilled in the art, the gooseneck is connected to a conventional truck tractor 13 at the forward end 12 of the gooseneck 10 while the rear end 14 of gooseneck 10 is adapted for connection through a base unit 15 to a conventional low bed trailer 16 which is capable of carrying a load such as a piece of construction equipment 18. The trailer 16 typically has an elongated flatbed 20 supported at its rear end by a plurality of wheels 22. The flatbed 20 pivots about the wheels 22 with the forward end of the trailer 16 interconnected to and supported by the gooseneck 10. The tractor 13 similarly is a conventional unit having rear wheels 24 and a fifth wheel 26 that provides for connection to the gooseneck 10.

Figure 6:
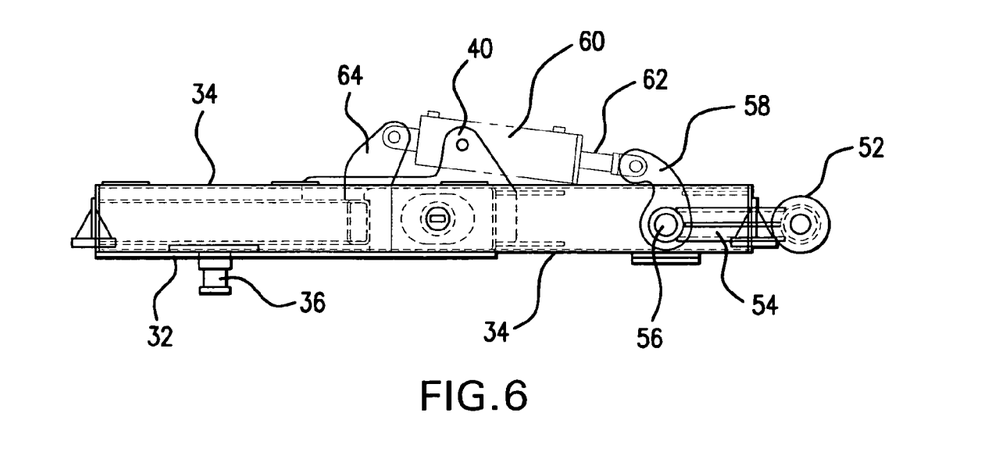
FIG. 6 is a side or elevational view of the cylinder and connecting members for raising and lowering the stinger arm.

The gooseneck 10 has a pair of longitudinally extending support beams 28 laterally spaced apart and connected by cross beams 30. Within the space defined by the support beams 28 and cross beams 30, there is a rectangular king pin frame assembly 34 which supports a king pin plate 32 that is slideably mounted for limited movement forwardly and rearwardly within the gooseneck 10. FIG. 6 shows the king pin frame assembly 34 that is moveable relative to the support beams 28. Affixed to and extending downwardly from the king pin plate 32 is a king pin 36 which is adapted to be engaged with the fifth wheel 26 of the tractor 13 in a manner well known to those skilled in the art. The king pin plate 32 carried by the frame assembly 34 is moveable forwardly and rearwardly by hydraulic cylinder 38 (FIGS. 2 and 3), one end of which is connected to the cross beam 30 with the operating rod of hydraulic cylinder 38 being pivotally connected to a vertically extending member 40 that is affixed to the king pin frame assembly 34. Thus, when the hydraulic cylinder 38 is actuated, the king pin frame assembly 34 carrying with it the king pin 36 can be moved to one of a plurality of selected positions. In the illustrated embodiment, there are shown seven such selected positions, and openings 42 are formed in the support beams 28 to receive locking pins 44 that are biased into the selected one of openings 42 by springs 46. Pneumatic cylinder 48, when actuated, will disengage the pins 44 or engage them with a selected pair of openings 42 so that the king pin plate 32 can be moved to a desired position.

Providing for adjustable movement of king pin 36 by the foregoing described structure provides for shifting of the weight of the load 18 between the axles of the tractor 13 and the axles of the trailer 16. Since loads being carried by the trailer 16 vary widely depending upon the weight of the load itself and its position on the flatbed 20, movement of the king pin 36 to a selected position allows for optimum weight distribution so as to balance the load for over-the-road travel. If desired, a digital read-out display 50 can be mounted on the gooseneck 10 to simplify balancing of the distribution of weight being carried by the trailer 16.

To assure proper positioning of the gooseneck for accurate engagement of the king pin 36 with the fifth wheel 26 of the tractor 13, a horizontally extending stinger arm 52 is pivotally mounted to the frame 34 that carries the king pin plate 32. As best seen in FIG. 6, the stinger arm 52 is affixed to a pair of forwardly extending arms 54 which in turn are connected to a turnable pivot rod 56 that is pivotally secured to the king pin frame assembly 34. A pair of vertically extending arms 58 are affixed to the pivot rod 56, and a pair of hydraulic cylinders 60 have their operating rods 62 pivotally connected to the top of the vertical arms 58. The hydraulic cylinders 60 are in turn pivotally connected to a pair of mounting arms 64 affixed to the king pin frame assembly 34. Thus, as the hydraulic cylinders 60 are actuated, the stinger arm 52 can be swung downwardly, engaging the fifth wheel 26 of the tractor 13 to aid in accurately positioning the gooseneck 10 for accurate connection to the trailer 16 even on uneven terrain.

As best seen in FIGS. 2 and 3, the gooseneck 10 has at its rear end 14 a base unit 15 which is connected by a shaft 68 to the support beams 28 so as to provide for pivotal movement of the base unit 15 relative to the main part of the gooseneck 10. A cross beam 70 at the upper end of the base unit 15 contains a plurality of ears 72 to which are connected the operating rods 74 of the trailer lift hydraulic cylinders 76 which are in turn connected to cross member 78 of the gooseneck 10. When the base unit 15 of the gooseneck 10 and trailer 16 are interconnected, the trailer lift cylinders 76 provide for raising or lowering of the gooseneck 10. The base unit 15 includes two downwardly extending donut-shaped connectors or stirrups 80 which are engageable with corresponding load pins (not shown) on the trailer 16. The base unit 15 also carries a vertically moveable locking pin 82 that safely locks the base unit 15 and thus the gooseneck 10 to the trailer 16. At the upper end of the base unit 15 inside of the support beams 28 of the gooseneck 10 are a plurality of adjustment notches 84 which are engageable by the arm 86 of the gooseneck height adjustment lever 88. If needed or desired, this mechanism provides for variable ride height adjustment of the trailer 16.

Figure 7:
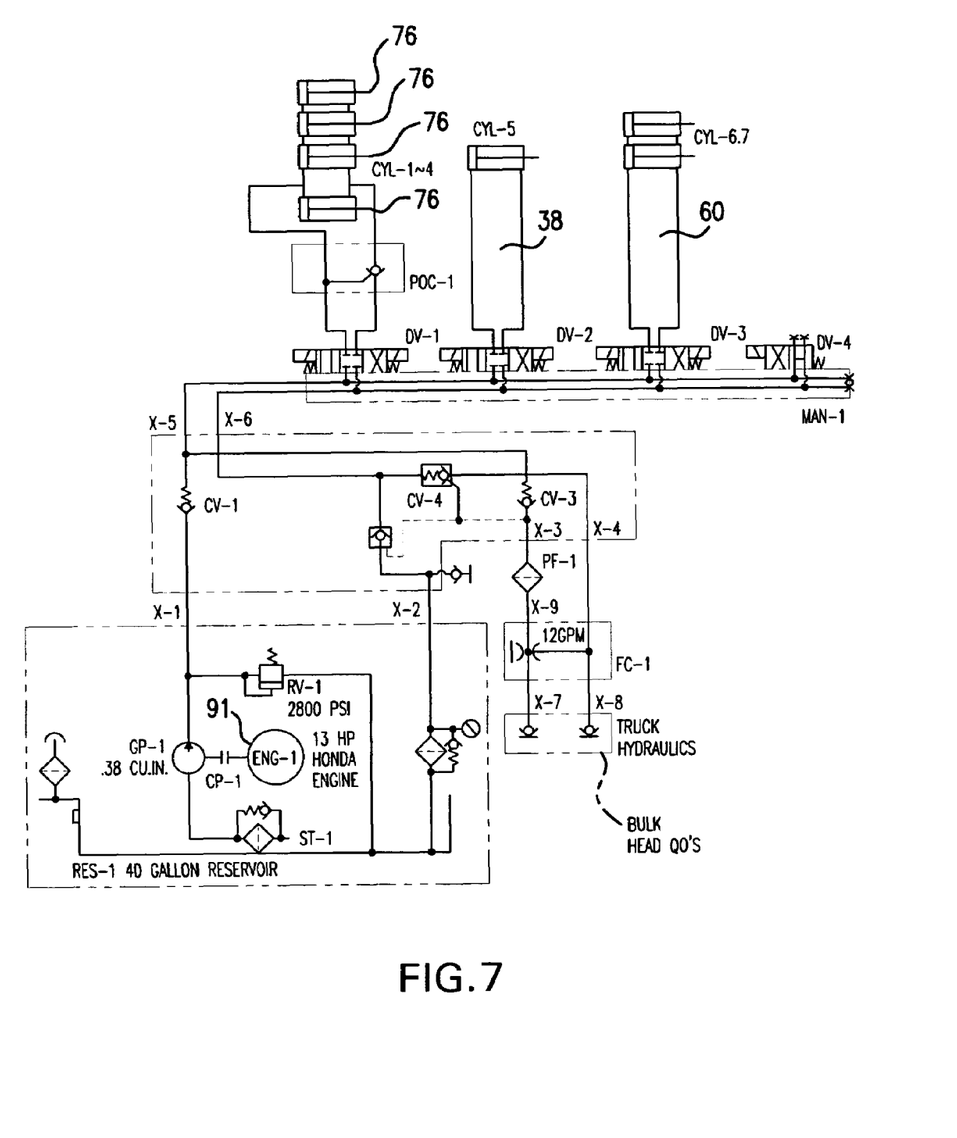
FIG. 7 is a schematic of the hydraulic system of the invention.
Figure 8:
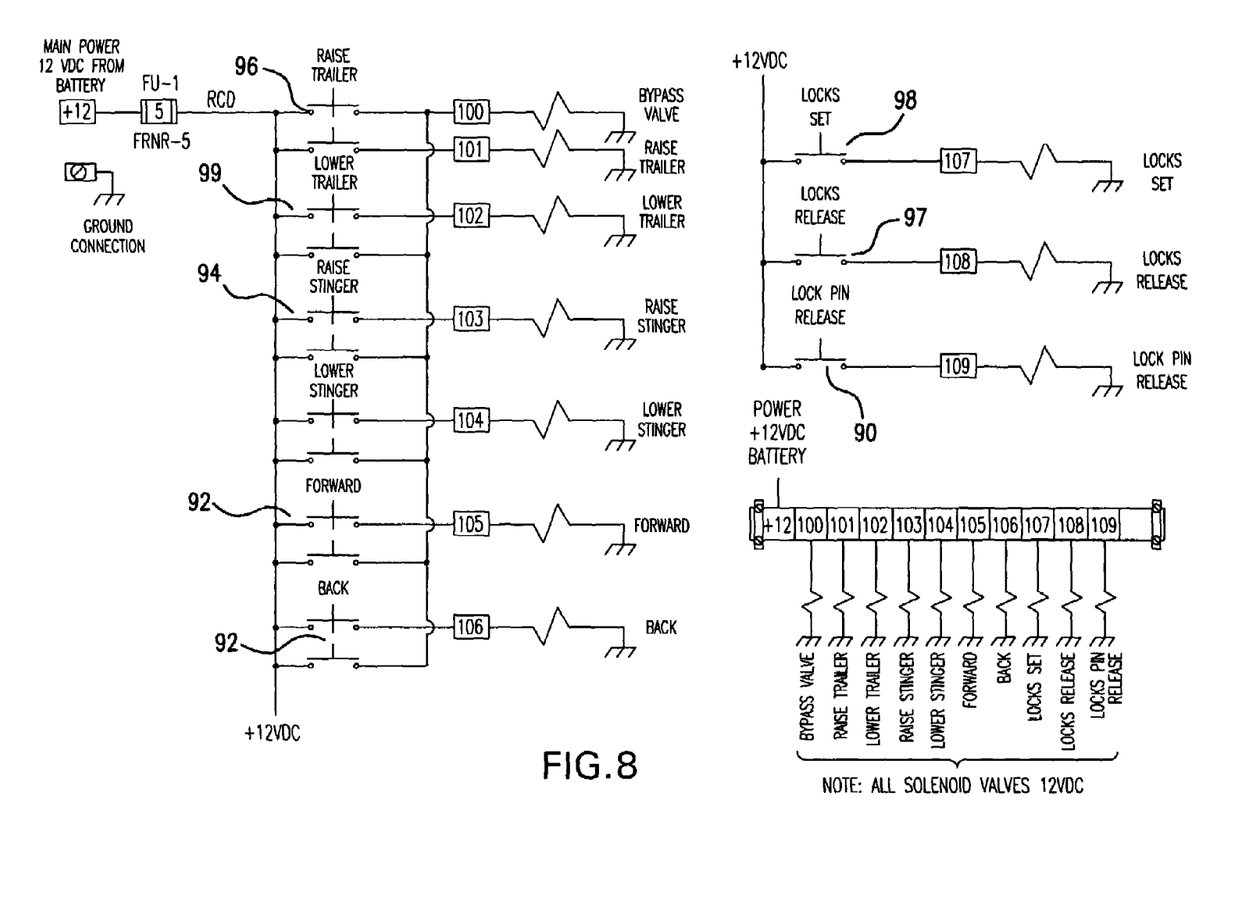
FIG. 8 is a schematic diagram of the basic control panel for controlling the hydraulic and pneumatic systems of the invention.

The invention also provides for a self-contained power unit 91 (see FIG. 7) that can be positioned inside of the base unit 15 to power the hydraulic system. Alternatively, the hydraulic system necessary to power the functions of the invention can be powered by the tractor 13. FIG. 7 is a schematic diagram of the hydraulic system for the invention. FIG. 8 is a schematic of the electrical system that provides for remote operation of the various functions of the system by merely pressing switches on a hand-held remote control unit (not shown but containing the switches shown in the schematic of FIG. 8) carried by the operator of the tractor 13. As indicated in FIG. 8, the electrical system is powered by the 12 volt battery of the tractor 13. Thus, by pressing one of the switches on the remote control unit for a selected function, a solenoid valve is actuated to actuate the selected hydraulic or pneumatic valve or cylinder. In the lower right part of FIG. 8, the solenoid valves are numbered 100 to 109 which corresponds to the numbers in the schematic of FIG. 8.

The operation of the system as described above will now be summarized. When it is desired to attach the gooseneck 10 and base unit 15 to the trailer 16, the gooseneck 10 is first attached to the fifth wheel 26 of the tractor 13. Preferably, the tractor 13 and the trailer 16 are on reasonably level ground. The operator then pushes switch 90 to drop the safety lock pin 82 and the tractor 13 is backed up toward the trailer 16. With the system of the invention, the gooseneck 10 can be fully attached to the trailer 16 without moving the truck 13 once the gooseneck 10 is in close proximity to the flat bed deck 20 of the trailer 16. Therefore, typically, the operator will get out of the cab of the truck 13 after it is backed up close to the trailer 16. Switch 92 is then actuated to actuate solenoid 106 resulting in movement of the gooseneck 10 rearwardly until the safety pin 82 drops into place in the trailer 16. Switch 94 is then actuated to actuate solenoid 103 to cause cylinders 60 to retract the stinger arm 52 into a stored position. Then, switch 96 is then activated to actuate solenoid 100 to caused power cylinders 76 to raise the trailer 16. The operator of the tractor 13 will then have to reconnect the air and electrical connections (not shown) between the gooseneck 10 and trailer 16. At the same time, if the operator desires to adjust the ride height of the trailer 16, the gooseneck adjustment lever 88 can be turned to engage the arm 88 in the desired notch. Using the hand-held remote, the operator will then actuate switch 98 to actuate solenoid 107 to cause pneumatic cylinders 48 to disengage the locking pins 44. Subsequently, if it is desired to adjust the swing clearance of the gooseneck 10, either switch 92 or switch 99 is actuated to cause the cylinders 38 to move the king pin plate 32 to the desired position. When in the desired position, switch 97 is actuated to actuate solenoid 108 to activate pneumatic cylinders 48 to engage the lock pins 44, thus locking the gooseneck in the desired position.

To remove the gooseneck 10 from the trailer 16, the foregoing steps are reversed, using switch 99 if necessary to actuate solenoid 102 to cause the trailer 16 to be lowered.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A gooseneck having a forward end and a rear end for interconnecting a low-boy trailer to the fifth wheel of a truck-tractor comprising:

support beams extending longitudinally from the forward end to the rear end of the gooseneck, the support beams being laterally spaced-apart;

a cross beam extending laterally between the support beams at the forward end of the gooseneck;

a king pin frame assembly moveable forwardly and rearwardly within the forward end of the gooseneck;

a king pin affixed to and extending downwardly from the king pin frame assembly, the king pin adapted to be engaged with and disengaged from the fifth wheel of the truck-tractor;

a first power cylinder mounted on the cross beam and operatively connected to the king pin frame assembly to move the assembly forwardly and rearwardly;

a stinger arm swingably mounted to the king pin frame assembly about a horizontal axis for pivotal movement upwardly and downwardly so as to engage the fifth wheel of the tractor;

a second power cylinder mounted on the king pin frame assembly and operatively connected to the stinger arm to pivot the stinger arm upwardly and downwardly;

a base unit pivotally mounted to the support beams at the rear end of the gooseneck;

a third power cylinder mounted on the support beams and operatively connected to the base unit to provide for pivotal movement of the base unit;

connectors affixed to the base unit and adapted to be engageable with the low-boy trailer to lock the gooseneck to the trailer; and operator controlled switches located remotely from the gooseneck to operate the first, second and third power cylinders and thereby control connection of the gooseneck with the truck-tractor and with the trailer.

2. The gooseneck of claim 1 in which there are a plurality of locking openings formed in each of the support beams adjacent the king pin frame assembly, and locking pins are mounted to the king pin frame assembly and extend laterally outwardly from the assembly to engage a selected one of the locking openings in the support beams thereby locking the king pin frame assembly in a selected position.

3. The gooseneck of claim 2 in which the locking pins are biased outwardly to a locking position, and locking pin power cylinders are operatively connected to the locking pins to disengage the pins from the locking openings.

4. The gooseneck of claim 3 in which operation of the locking pin power cylinders are controlled by the operator controlled switches located remotely from the gooseneck.

5. The gooseneck of claim 1 in which a ride-height adjustment lever is turnably mounted on the support beams, and the base unit is provided with a plurality of adjustment notches engageable by the adjustment lever, the adjustment lever being turnable to engage a selected notch and thereby vary the rid height of the trailer when connected to the gooseneck.

6. The gooseneck of claim 1 in which the base unit is provided with a locking pin adapted to be engaged with the trailer so as to positively and safely lock the gooseneck to the trailer.

* * * * *

UNITED STATES PATENT AND TRADEMARK OFFICE
CERTIFICATE OF CORRECTION

| | | |
|---|---|---|
| PATENT NO. | : 7,207,587 B1 | Page 1 of 1 |
| APPLICATION NO. | : 10/906980 | |
| DATED | : April 24, 2007 | |
| INVENTOR(S) | : George Wall | |

It is certified that error appears in the above-identified patent and that said Letters Patent is hereby corrected as shown below:

Title page item 75 should read --George Wall--
Inventor's middle initial "W" be removed from Inventor's name on all documents relating to this patent and any patent(s) that subsequently issue(s) from this patent application. The "W" was a typographical error and mistakenly included as Inventor's middle initial without any deceptive intent.

Signed and Sealed this

First Day of July, 2008

JON W. DUDAS
*Director of the United States Patent and Trademark Office*